US012580612B2

(12) United States Patent
Nilsson et al.

(10) Patent No.: US 12,580,612 B2
(45) Date of Patent: Mar. 17, 2026

(54) TRIGGERING OF REPORT CONFIGURATION FOR REPORTINGS OF MIMO CHANNEL INFORMATION FROM USER EQUIPMENT

(71) Applicant: Telefonaktiebolaget LM Ericsson (publ), Stockholm (SE)

(72) Inventors: Andreas Nilsson, Gothenburg (SE);
Arne Simonsson, Gammelstad (SE);
Fredrik Athley, Västra Frölunda (SE);
Anders Landström, Boden (SE);
Eleftherios Karipidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

(21) Appl. No.: 18/579,191

(22) PCT Filed: Jul. 15, 2021

(86) PCT No.: PCT/EP2021/069910
§ 371 (c)(1),
(2) Date: Jan. 12, 2024

(87) PCT Pub. No.: WO2023/284971
PCT Pub. Date: Jan. 19, 2023

(65) Prior Publication Data
US 2024/0322866 A1     Sep. 26, 2024

(51) Int. Cl.
*H04B 7/0413* (2017.01)
*H04B 7/06* (2006.01)
*H04W 24/10* (2009.01)

(52) U.S. Cl.
CPC ......... *H04B 7/0413* (2013.01); *H04B 7/0632* (2013.01); *H04W 24/10* (2013.01)

(58) Field of Classification Search
CPC .... H04B 7/0413; H04B 7/0632; H04W 24/10
See application file for complete search history.

(56) References Cited

U.S. PATENT DOCUMENTS

| | | | | |
|---|---|---|---|---|
| 2021/0092627 A1* | 3/2021 | Radulescu | ............ | H04L 5/0053 |
| 2021/0351824 A1 | 11/2021 | Kim et al. | | |
| 2024/0015663 A1* | 1/2024 | Yuan | .................... | H04W 52/42 |

FOREIGN PATENT DOCUMENTS

| | | |
|---|---|---|
| WO | 2020/060337 A1 | 3/2020 |
| WO | 2021/059239 A1 | 4/2021 |

OTHER PUBLICATIONS

International Search Report and Written Opinion dated May 2, 2022 in International Application No. PCT/EP2021/069910 (8 pages).

(Continued)

*Primary Examiner* — Janice N Tieu

(74) *Attorney, Agent, or Firm* — Rothwell, Figg, Ernst & Manbeck, P.C.

(57) ABSTRACT

There is provided mechanisms for triggering user equipment to use a report configuration. A method is performed by a network node. The method comprises triggering user equipment to use a report configuration. According to the report configuration the user equipment are to report at least one metric pertaining to MIMO channel information back to the network node. According to the report configuration the at least one metric is to be based on measurements made by the user equipment on an SSB reference signal. The method comprises receiving reportings of the MIMO channel information from the user equipment in accordance with the triggered report configuration.

20 Claims, 6 Drawing Sheets

(56) References Cited

OTHER PUBLICATIONS

Tateishi, K. et al., 2016, "Indoor Experiment on 5G Radio Access Using Beam Tracking at 15 GHz Band", 2016 IEEE 27th Annual International Symposium on Personal, Indoor, and Mobile Radio Communications (PIMRC): Workshop: Inclusive Radio Communication Networks for 5G and Beyond (IRACON2016) (6 pages).

* cited by examiner

S202
Obtain report configuration

S204
Obtain triggering to use report configuration

S206
Receive SSB reference signal

S208
Obtain MIMO channel information from measurements

S210
Provide reporting of MIMO channel information to network node

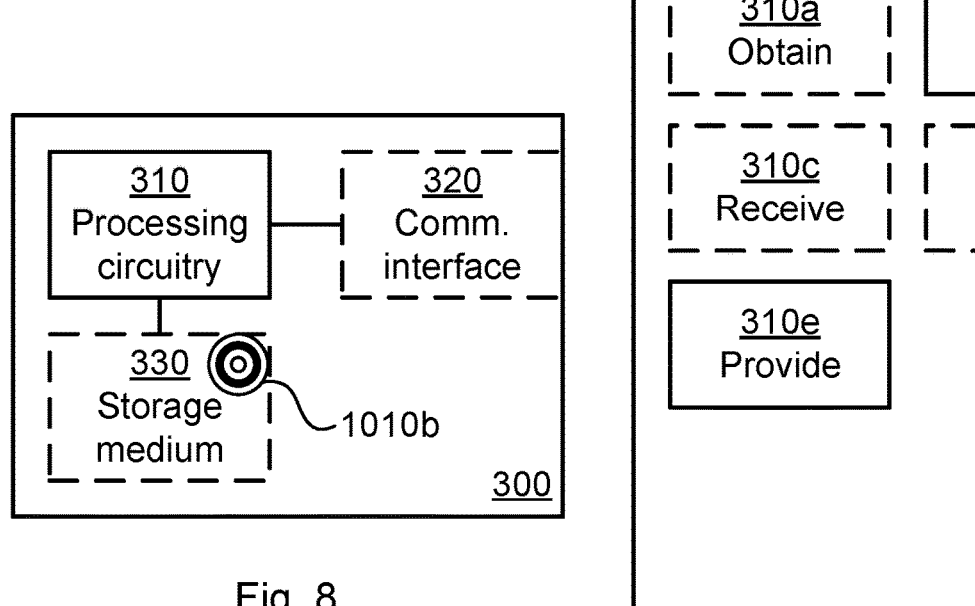
Fig. 8
Fig. 9
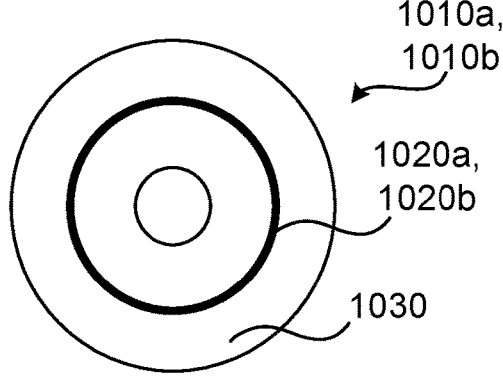
Fig. 10

TRIGGERING OF REPORT CONFIGURATION FOR REPORTINGS OF MIMO CHANNEL INFORMATION FROM USER EQUIPMENT

CROSS REFERENCE TO RELATED APPLICATIONS

This application is a 35 U.S.C. § 371 National Stage of International Patent Application No. PCT/EP2021/069910, filed 2021 Jul. 15.

TECHNICAL FIELD

Embodiments presented herein relate to a method, a network node, a computer program, and a computer program product for triggering user equipment to use a report configuration. Embodiments presented herein further relate to a method, a user equipment, a computer program, and a computer program product for the user equipment to be triggered to use the report configuration.

BACKGROUND

In communications networks based on the New Radio (NR) air interface, a unique reference signal is transmitted from each port at the (radio) access network node at the network side for downlink channel estimation at a user equipment (UE) at the user side. Reference signals for downlink channel estimation are commonly referred to as channel state information reference signals (CSI-RS). For N ports, there will be N CSI-RS signals, one per each port.

By measuring on the reference signals, a UE can estimate the effective channel the reference signals is traversing over the air interface, where the effective channel defines characteristics of the radio propagation channel and antenna gains at both the access network node and the UE. Mathematically, this implies that if a known reference signal $x_i$ ($i=1, 2, \ldots, N_{tx}$) is transmitted on the i:th transmit port at the access network node, the received signal $y_j$ ($j=1, 2, \ldots, N_{rx}$) on the j:th receive port of the UE can be expressed as:

$$y_j = h_{i,j} x_i + n_j$$

Here, $h_{i,j}$ is the effective channel between the i:th transmit port and the j:th receive port, $n_j$ is the receiver noise associated with the j:th receive port, $N_{tx}$ is the number of transmit ports at the access network node and $N_{rx}$ is the number of receive ports at the UE.

A UE can estimate the $N_{rx} \times N_{tx}$ effective channel matrix H (H(i, j)=$h_{i,j}$) and thus the channel rank, precoding matrix, and channel quality. This is achieved by using a predesigned codebook for each rank, with each codeword in the codebook being a precoding matrix candidate. A UE searches through the codebook to find a rank, a codeword associated with the rank, and channel quality associated with the rank and precoding matrix to best match the effective channel. The rank, the precoding matrix and the channel quality are reported in the form of a rank indicator (RI), a precoding matrix indicator (PMI) and a channel quality indicator (CQI) as part of channel state information (CSI) feedback. This results in so-called channel dependent precoding, or closed-loop precoding. Such precoding essentially strives to focus the transmit energy of the access network node into a subspace which is strong in the sense of conveying much of the transmitted energy to the UE.

The reference signal is transmitted on a set of time-frequency resource elements (REs) associated with a port. For channel estimation over a system bandwidth, the reference signal is typically transmitted over the whole system bandwidth. The set of REs used for reference signal transmission is referred to as reference signal resource (and hence CSI-RS resource if the reference signal is a CSI-RS). From a UE point of view, a port is equivalent to a CSI-RS that the UE shall use to measure the channel. Up to 32 (i.e. $N_{tx}$=32) ports are supported in NR and thus 32 CSI-RS signals can be configured for a UE.

In NR, there is support for periodic CSI-RS transmission, aperiodic CSI-RS transmission, and semi-persistent CSI-RS transmission.

Periodic CSI-RS Transmission: CSI-RS is transmitted periodically in certain subframes or slots. This CSI-RS transmission is semi-statically configured using parameters such as CSI-RS resource, periodicity and subframe or slot offset similar to as used over the Long Term Evolution (LTE) air interface.

Aperiodic CSI-RS Transmission: This is a one-shot CSI-RS transmission that can occur in any subframe or slot. Here, one-shot means that CSI-RS transmission only occurs once per trigger. The CSI-RS resources (i.e., the resource element locations which consist of subcarrier locations and Orthogonal Frequency Division Multiplexing (OFDM) symbol locations) for aperiodic CSI-RS are semi-statically configured. The transmission of aperiodic CSI-RS is triggered by dynamic signaling through PDCCH. The triggering may also include selecting a CSI-RS resource from multiple CSI-RS resources.

Semi-Persistent CSI-RS Transmission: Similar to periodic CSI-RS, resources for semi-persistent CSI-RS transmissions are semi-statically configured with parameters such as periodicity and subframe or slot offset. However, unlike periodic CSI-RS, dynamic signaling is needed to activate and possibly deactivate the CSI-RS transmission.

In communications networks where the LTE air interface is used, UEs can be configured to report CSI in periodic or aperiodic reporting modes. Periodic CSI reporting is carried on the physical uplink control channel (PUCCH) whilst aperiodic CSI is carried on the physical uplink shared channel (PUSCH). PUCCH is transmitted in a fixed or configured number of physical resource blocks (PRBs) and using a single spatial layer (or rank 1) with quadrature phase shift keying (QPSK) modulation. PUSCH resources carrying aperiodic CSI reporting are dynamically allocated through uplink grants carried over PDCCH or enhanced PDCCH (EPDCCH), and can occupy a variable number of PRBs, use modulation states such as QPSK, 16 QAM, and 64 QAM, as well as multiple spatial layers (where QAM is short for quadrature amplitude modulation).

In communications networks where the NR air interface is used, in addition to periodic and aperiodic CSI reporting as in LTE, semi-persistent CSI reporting might also be supported. Thus, three types of CSI reporting will be supported in NR as follows.

Periodic CSI Reporting: CSI is reported periodically by the UE. Parameters such as periodicity and subframe or slot offset are configured semi-statically, by higher layer signaling from the access network node to the UE.

Aperiodic CSI Reporting: This type of CSI reporting involves a single-shot (i.e., one time) CSI report by the UE, which is dynamically triggered by the access network node, e.g. by downlink control information (DCI) sent in the PDCCH. Some of the parameters related to the configuration of the aperiodic CSI report are semi-statically configured from the access network node to the UE but the triggering is dynamic.

Semi-Persistent CSI Reporting: Similar to periodic CSI reporting, semi-persistent CSI reporting has a periodicity and subframe or slot offset which may be semi-statically configured by the access network node to the UE. However, a dynamic trigger from access network node to UE may be needed to allow the UE to begin semi-persistent CSI reporting.

With regards to CSI-RS transmission and CSI reporting, the following combinations might be supported in NR. For periodic CSI-RS transmission, semi-persistent CSI reporting is dynamically activated/deactivated and/or aperiodic CSI reporting is triggered by DCI. For semi-persistent transmission of CSI-RS, Semi-persistent CSI reporting is activated/deactivated dynamically and/or aperiodic CSI reporting is triggered by DCI. For aperiodic transmission of CSI-RS, aperiodic CSI reporting is triggered by DCI and/or aperiodic CSI-RS is triggered dynamically.

In communications networks where the NR air interface is used, the UE can be configured with $X_1 \geq 1$ CSI reporting settings, $X_2 \geq 1$ resource settings, and one CSI measurement setting, where the CSI measurement setting includes $X_3 \geq 1$ links and the value of $X_3$ may depend on the UE capability. At least the following configuration parameters are signaled via radio resource control (RRC) signalling at least for CSI acquisition. The values of $X_1$, $X_2$, and $X_3$ are indicated either implicitly or explicitly. In each CSI reporting setting, at least: reported CSI parameter(s), CSI Type (I or II) if reported, codebook configuration including codebook subset restriction, time-domain behavior, frequency granularity for CQI and PMI, measurement restriction configurations. In each resource setting: a configuration of $S \geq 1$ CSI-RS resource set(s), a configuration of $K_s \geq 1$ CSI-RS resources for each set s, including at least: mapping to REs, the number of ports, time-domain behavior, etc. Time domain behavior: aperiodic, periodic or semi-persistent. RS type which encompasses at least CSI-RS. In each of the $X_3$ links in CSI measurement setting: CSI reporting setting indication, resource setting indication, quantity to be measured (either channel or interference). One CSI reporting setting can be linked with one or multiple resource settings. Multiple CSI reporting settings can be linked At least, the following are dynamically selected by protocol layer 1 (L1) or protocol layer 2 (L2) signaling, if applicable: one or multiple CSI reporting settings within the CSI measurement setting, one or multiple CSI-RS resource sets selected from at least one resource setting, one or multiple CSI-RS resources selected from at least one CSI-RS resource set A suitable directional beam (or just beam, for short) to be used at the access network node for communication with the UE can be determined from a beam sweep where the access network node transmits different downlink reference signals (such as CSI-RS or synchronization signal block (SSB) reference signals) in different beams. One example structure of an SSB is illustrated in FIG. 1. FIG. 1 schematically illustrates time/frequency resources for one SSB reference signal 10 (where PRB is short for Physical resource Block). The SSB reference signal 10 consist of four OFDM symbols, in FIG. 1 denoted OFDM symb 1, OFDM symb 2, OFDM symb 3, and OFDM symb 4. Time/frequency resources for a Primary Synchronization Signal (PSS) are located in the first OFDM symbol and are used for finding a coarse time/frequency synchronization. Time/frequency resources for a Physical Broadcast Channel (PBCH) are located in the second, third and fourth OFDM symbol and contain necessary system information bits. Time/frequency resources for a Secondary Synchronization Signal (SSS) are located in the second OFDM symbol and are used for establishing a finer time/frequency synchronization.

The UE then performs measurement on the downlink reference signals and reports the indices of the best downlink reference signals (and the corresponding measurement values) back to the access network node. What kind of measurements and reporting that the UE should perform during a beam sweep as performed by the access network node is mainly defined by the parameters reportQuantity/reportQuantity-r16 and nrOfReportedRS/nrofReportedRS-ForSINR-r16 in the CSI reporting setting information element (IE) as described in 3GPP TS 38.331, entitled "NR; Radio Resource Control (RRC); Protocol specification", version 16.5.0. By setting the parameter reportQuantity to either cri-RSRP or ssb-Index-RSRP (depending on if CSI-RSs or SSB reference signals are used as downlink reference signal in the beam sweep) the UE will measure and report reference signal received power (RSRP) for the beams with highest RSRP. By setting the parameter reportQuantity-r16 to either cri-SINR-r16, or ssb-Index-SINR-r16 the UE will instead measure and report signal to interference plus noise ratio (SINR) for the beams with highest SINR. In addition, the access network node can determine the number of best beams that the UE should report during each beam sweep by setting the parameter nrofReportedRS/nrofReportedRS-ForSINR-r16 to either 2 or 4; if the fields are absent only the best beam is reported.

However, existing CSI reporting settings, as exemplified above might be inadequate to enable the network node to, in a time-efficient manner, acquire accurate channel information in scenarios where the channel exhibits multiple-input multiple-output (MIMO) characteristics.

SUMMARY

An object of embodiments herein is to address the above issues by providing techniques that enable the network node to in a time-efficient acquire accurate MIMO channel information.

According to a first aspect there is presented a method for triggering user equipment to use a report configuration. The method is performed by a network node. The method comprises triggering user equipment to use a report configuration. According to the report configuration the user equipment are to report at least one metric pertaining to MIMO channel information back to the network node. According to the report configuration the at least one metric is to be based on measurements made by the user equipment on an SSB reference signal. The method comprises receiving reportings of the MIMO channel information from the user equipment in accordance with the triggered report configuration.

According to a second aspect there is presented a network node for triggering user equipment to use a report configuration. The network node comprises processing circuitry. The processing circuitry is configured to cause the network node to trigger user equipment to use a report configuration. According to the report configuration the user equipment are to report at least one metric pertaining to MIMO channel information back to the network node. According to the report configuration the at least one metric is to be based on measurements made by the user equipment on an SSB reference signal. The processing circuitry is configured to cause the network node to receive reportings of the MIMO channel information from the user equipment in accordance with the triggered report configuration.

According to a third aspect there is presented a network node for triggering user equipment to use a report configuration. The network node comprises a trigger module configured to trigger user equipment to use a report configuration. According to the report configuration the user equipment are to report at least one metric pertaining to MIMO channel information back to the network node. According to the report configuration the at least one metric is to be based on measurements made by the user equipment on an SSB reference signal. The network node comprises a receive module configured to receive reportings of the MIMO channel information from the user equipment in accordance with the triggered report configuration.

According to a fourth aspect there is presented a computer program for triggering user equipment to use a report configuration, the computer program comprising computer program code which, when run on processing circuitry of a network node, causes the network node to perform a method according to the first aspect.

According to a fifth aspect there is presented a method for a user equipment to be triggered to use a report configuration. The method is performed by the user equipment. The method comprises obtaining, from a network node, triggering to use a report configuration. According to the report configuration the user equipment is to report at least one metric pertaining to MIMO channel information back to the network node. According to the report configuration the at least one metric is to be based on measurements made by the user equipment on an SSB reference signal. The method comprises providing reporting of the MIMO channel information to the network node in accordance with the triggered report configuration.

According to a sixth aspect there is presented a user equipment for a user equipment to be triggered to use a report configuration. The user equipment comprises processing circuitry. The processing circuitry is configured to cause the user equipment to obtain, from a network node, triggering to use a report configuration. According to the report configuration the user equipment is to report at least one metric pertaining to MIMO channel information back to the network node. According to the report configuration the at least one metric is to be based on measurements made by the user equipment on an SSB reference signal. The processing circuitry is configured to cause the user equipment to provide reporting of the MIMO channel information to the network node in accordance with the triggered report configuration.

According to a seventh aspect there is presented a user equipment for a user equipment to be triggered to use a report configuration. The user equipment comprises an obtain module configured to obtain, from a network node, triggering to use a report configuration. According to the report configuration the user equipment is to report at least one metric pertaining to MIMO channel information back to the network node. According to the report configuration the at least one metric is to be based on measurements made by the user equipment on an SSB reference signal. The user equipment comprises a provide module configured to provide reporting of the MIMO channel information to the network node in accordance with the triggered report configuration.

According to an eighth aspect there is presented a computer program for a user equipment to be triggered to use a report configuration, the computer program comprising computer program code which, when run on processing circuitry of the user equipment, causes the user equipment to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects enable the network node to in a time-efficient manner acquire accurate MIMO channel information.

Advantageously, these aspects enable the network node to obtain improved channel information, in terms of MIMO channel information, from the user equipment based on SSB reference signals. This can facilitate downlink transmission without the additional step of transmitting CSI-RS for obtaining CSI from the user equipment.

Advantageously, these aspects provide improved user throughput for both non-standalone (NSA) deployments and stand-alone deployments (SA) of the NR air interface with anchor carrier in the frequency range denoted FR1 and a secondary carrier in the frequency range denoted FR2.

Advantageously, these aspects provide improved reliability for beam selection based on SSB reference signals due to increased polarization diversity of the SSB reference signals that better match dual-polarized downlink transmission of data signals.

Advantageously, these aspects enable beam selection to be made with respect to a criterion on highest throughput capacity rather than highest signal strength.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 8 is a schematic diagram showing functional units of a user equipment according to an embodiment;

FIG. 9 is a schematic diagram showing functional modules of a user equipment according to an embodiment; and FIG. 10 shows one example of a computer program product comprising computer readable means according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
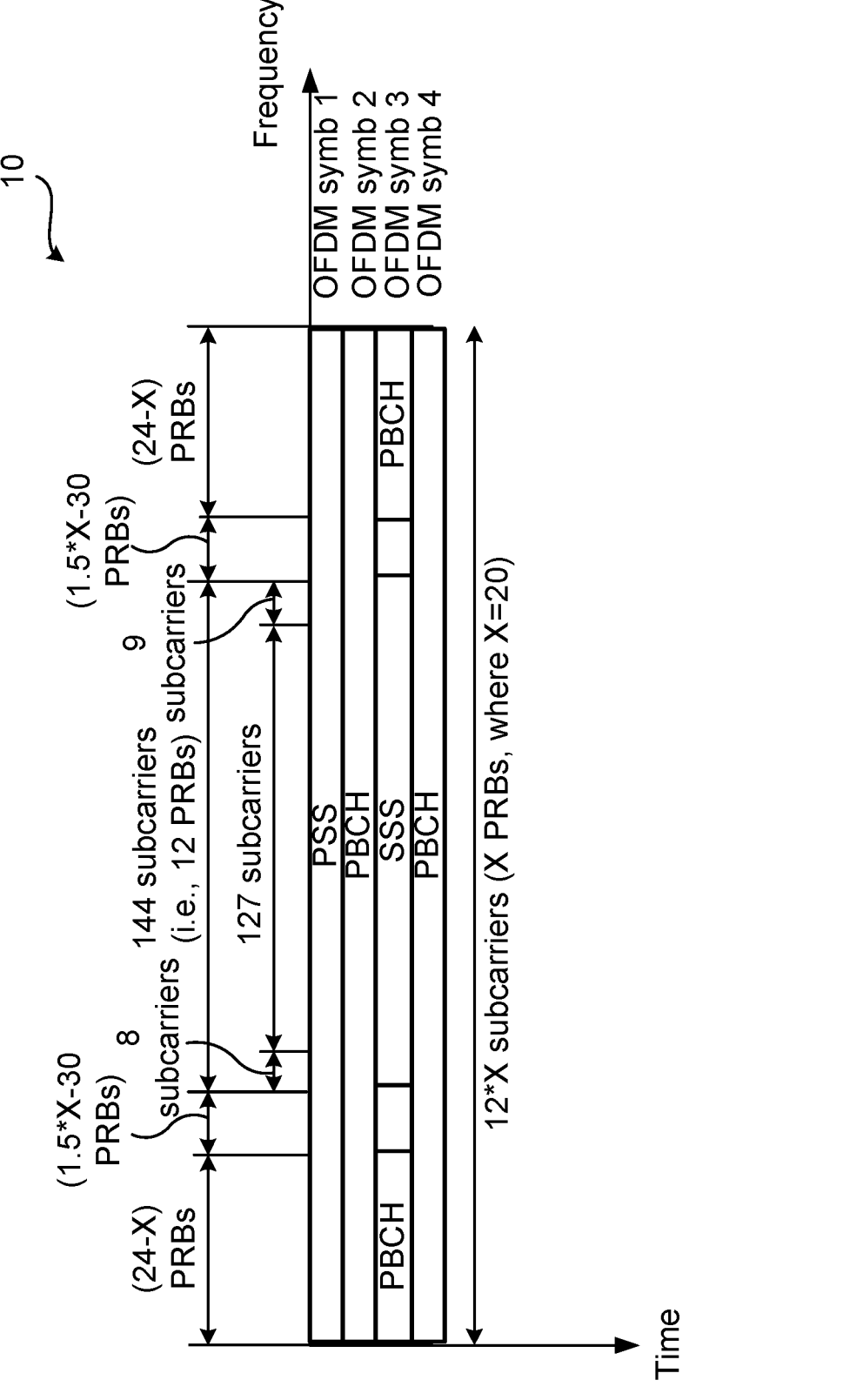
FIG. 1 schematically illustrates time/frequency resources for one SSB reference signal.
Figure 2:
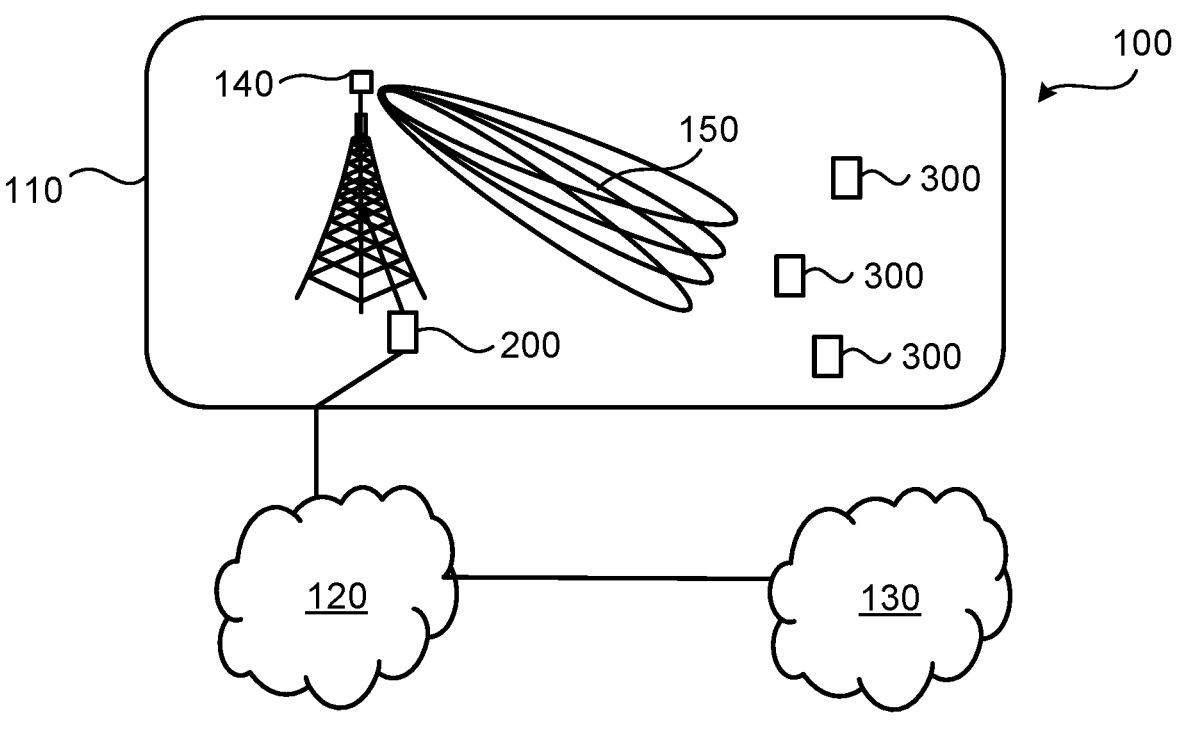
FIG. 2 is a schematic diagram illustrating a communications network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, a fifth generation (5G) telecommunications network, or a sixth generation (6G) telecommunications network, and support any 3GPP telecommunications standard, where applicable.

The communications network 100 comprises a network node 200 configured to provide network access to user equipment 300 in a (radio) access network 110. The access network 110 is operatively connected to a core network 120. The core network 120 is in turn operatively connected to a service network 130, such as the Internet. The user equipment 300 are thereby enabled to, via the network node 200, access services of, and exchange data with, the service network 130. The network node 200 comprises, is collocated with, is integrated with, or is in operational communications with, a transmission and reception point (TRP) 140. The network node 200 (via its TRP 140) and the user equipment 300 are configured to communicate with each other in beams 150.

Examples of network nodes 200 are radio access network nodes, radio base stations, base transceiver stations, Node Bs, evolved Node Bs, gNBs, access points, access nodes, backhaul nodes, and integrated access and backhaul nodes. Examples of user equipment 300 are terminal devices, wireless devices, mobile stations, mobile phones, handsets, wireless local loop phones, smartphones, laptop computers, tablet computers, network equipped sensors, network equipped vehicles, and so-called Internet of Things devices.

As disclosed above, existing CSI reporting settings might be inadequate to enable the network node 200 to, in a time-efficient manner, acquire accurate MIMO channel information.

In more detail, one issue is that the SSB reference signals are only transmitted on a single port (i.e. with a single polarization in each unique direction), which implies that polarization mis-match easily can occur between the network node 200 and the user equipment 300. In turn, this could lead to that the network node 200 does not select the optimal beam for its communication with the network node 200.

Another issue is that the network node 200 is not enabled to attain detailed downlink channel state information (such as PMI, rank information, or CQI) based on SSB reference signals. This is since the user equipment 300 will only perform measurements with respect to RSRP values or SINR values during abeam sweep. This implies that the network node 200 typically needs to transmit an addition downlink reference signal to attain reliable detailed downlink channel state information (such as PMI, rank information, or CQI) for coming downlink data transmission towards the user equipment 300. This extra transmission of an addition downlink reference signal cause extra overhead and latency. The delay is critical for non-standalone (NSA) deployments of the NR air interface where the value of adding carriers for reducing session time and overall user throughput is degraded with an initial delay.

The embodiments disclosed herein therefore relate to mechanisms for triggering user equipment 300 to use a report configuration and a user equipment to be triggered to use the report configuration. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a user equipment 300, a method performed by the user equipment 300, and a computer program product comprising code, for example in the form of a computer program, that when run on processing circuitry of the user equipment 300, causes the user equipment 300 to perform the method.

Figure 3:
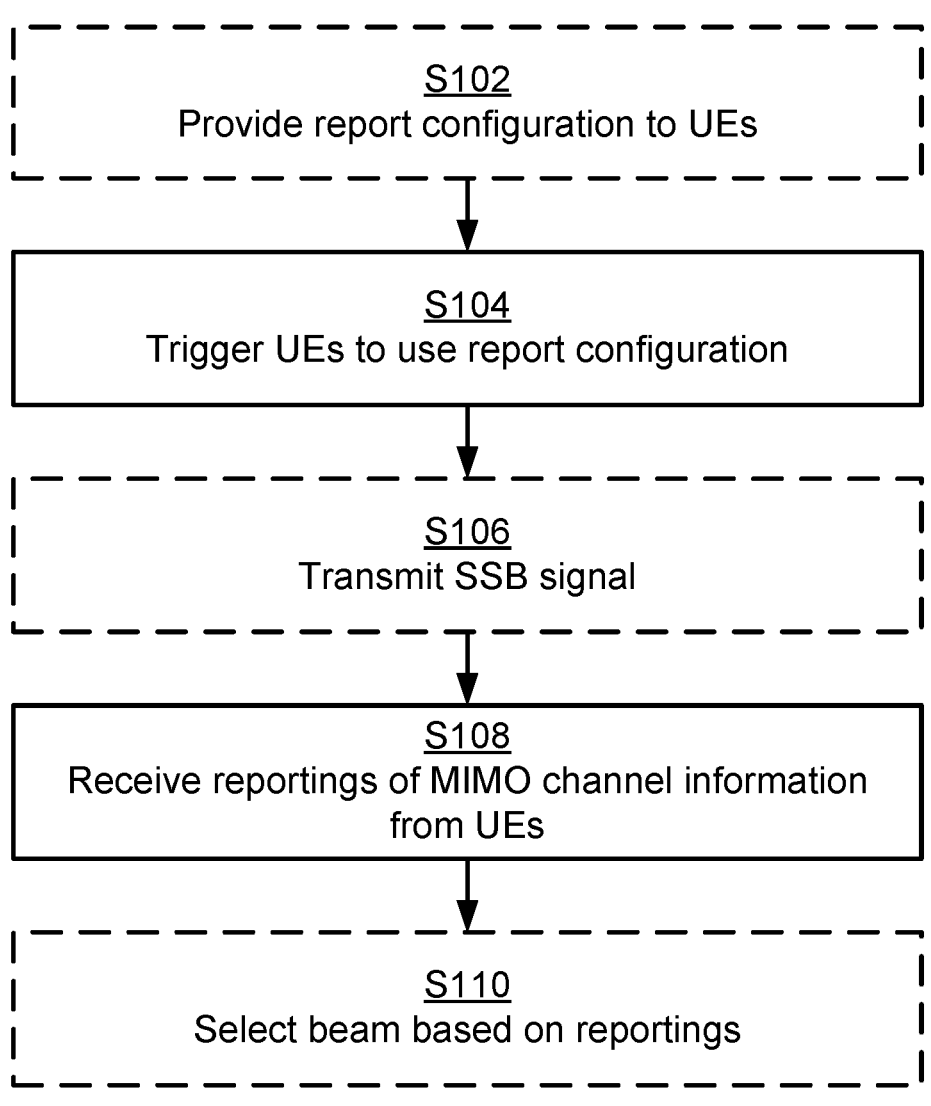
FIGS. 3 and 4 are flowcharts of methods according to embodiments.

Reference is now made to FIG. 3 illustrating a method for triggering user equipment 300 to use a report configuration as performed by the network node 200 according to an embodiment. In general terms, the user equipment 300 is triggered to use a report configuration that defines a report metric for MIMO channel information based on measurements on an SSB reference signal.

S104: The network node 200 triggers user equipment 300 to use a report configuration. According to the report configuration, the user equipment 300 are to report at least one metric pertaining to MIMO channel information back to the network node 200. According to the report configuration, the at least one metric is to be based on measurements made by the user equipment 300 on an SSB reference signal 10, 20.

It is assumed that the user equipment 300 use the report configuration and hence provide reportings of the MIMO channel information towards the network node 200.

S108: The network node receives reportings of the MIMO channel information from the user equipment 300 in accordance with the triggered report configuration.

This method provides a framework that enable the user equipment 300 to report MIMO channel information, such as CQI, rank information, PMI directly on SSB reference signals for a rank value higher than 1. In turn, this will reduce the number of steps needed for the beam refinement procedure from three steps to one single step. In addition, by allowing different OFDM symbols of an SSB reference signal to be transmitted on different polarizations, the risk of polarization mismatching is reduced, which will lead to more reliable beam selection at the network node 200.

Embodiments relating to further details of triggering user equipment 300 to use a report configuration as performed by the network node 200 will now be disclosed.

In some aspects, the user equipment 300 are provided with the report configuration from the network node 200. Particularly, in some aspects, the network node 200 is configured to perform (optional) step S102:

S102: The network node 200 provides the report configuration towards the user equipment 300.

There might be different ways for the network node 200 to provide the report configuration towards the user equipment 300.

In some aspects, the user equipment 300 are provided with the report configuration as part of initial access or after initial access. That is, in some embodiments, the report configuration is provided towards the user equipment 300 as part of the network node 200 performing initial access for the user equipment 300 or upon the network node 200 having performed initial access for the user equipment 300.

In some aspects, the user equipment 300 are provided with at least part of the report configuration in conjunction with the transmission of the SSB reference signal 10, 20. That is, in some embodiments, at least part of the report configuration is provided in the SSB reference signal 10, 20 that is transmitted.

In other aspects, as will be disclosed below, the user equipment 300 are preconfigured with the report configuration, or provided with the report configuration from another entity than the network node 200.

In some aspects, the network node 200 is also responsible of the actual transmission of, or at least for initiating the transmission of, the SSB reference signal 10, 20. Particularly, in some aspects, the network node 200 is configured to perform (optional) step S106:

S106: The network node 200 transmits the SSB reference signal 10, 20.

There could be different uses by the network node 200 of the reportings of the MIMO channel information from the user equipment 300. In some aspects, the reportings of the MIMO channel information are used for beam selection. Particularly, in some aspects, the network node 200 is configured to perform (optional) step S110:

S110: The network node 200 selects at least one beam 150 in which one of the user equipment 300 is to be served by the network node 200 based on the received reportings of the MIMO channel information from this one of the user equipment 300.

Figure 4:
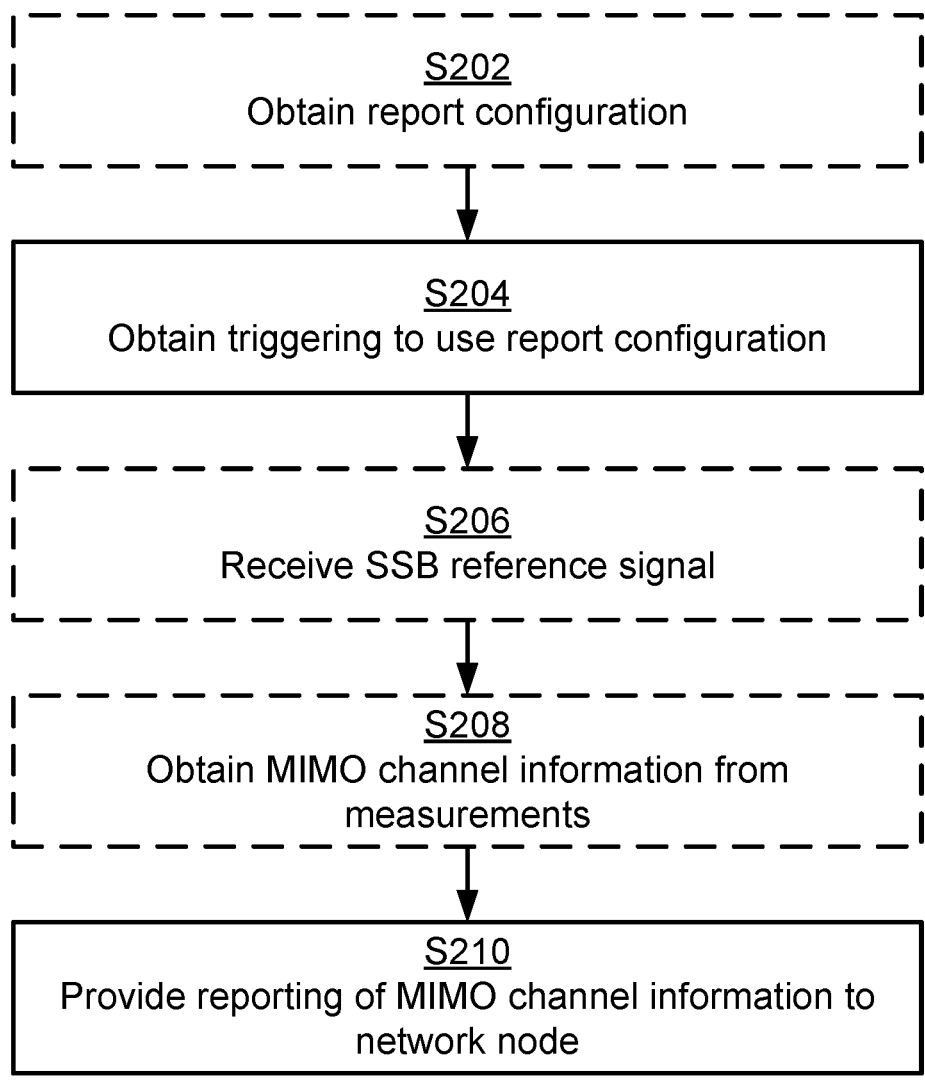

Reference is now made to FIG. 4 illustrating a method for a user equipment 300 to be triggered to use a report configuration as performed by the user equipment 300 according to an embodiment.

As disclosed above, the user equipment 300 is triggered to use a report configuration that defines a report metric for MIMO channel information based on measurements on an SSB reference signal.

S204: The user equipment 300 obtains, from the network node 200, triggering to use a report configuration. According to the report configuration, the user equipment 300 is to report at least one metric pertaining to MIMO channel information back to the network node 200. According to the report configuration, the at least one metric is to be based on measurements made by the user equipment 300 on an SSB reference signal 10, 20.

The user equipment 300 the utilizes the report configuration when reporting the MIMO channel information to the network node 200.

S210: The user equipment 300 provides reporting of the MIMO channel information to the network node 200 in accordance with the triggered report configuration.

Embodiments relating to further details for the user equipment 300 to be triggered to use the report configuration as performed by the user equipment 300 will now be disclosed.

As disclosed above, in some aspects, the user equipment 300 are provided with the report configuration from the network node 200. Therefore, in some aspects, the user equipment 300 is configured to perform (optional) step S202:

S202: The user equipment 300 obtains, from the network node 200, the report configuration.

As further disclosed above, in some aspects, the user equipment 300 is provided with the report configuration as part of initial access or after initial access. That is, in some embodiments, the report configuration is obtained as part of initial access for the user equipment 300 or upon initial access having been performed for the user equipment 300.

As further disclosed above, in some aspects, the user equipment 300 is provided with at least part of the report configuration in conjunction with the transmission of the SSB reference signal 10, 20. That is, in some embodiments, at least part of the report configuration is obtained in the SSB reference signal 10, 20 that is received.

As further disclosed above, in other aspects, the user equipment 300 is preconfigured with the report configuration, or provided with the report configuration from another entity than the network node 200.

Generally, the user equipment 300 needs to receive the SSB reference signal 10, 20 in order to make reportings of the MIMO channel information to the network node 200. Particularly, in some aspects, the user equipment 300 is configured to perform (optional) step S206 and S208:

S206: The user equipment 300 receives the SSB reference signal 10, 20.

S206: The user equipment 300 obtains the MIMO channel information from measurements on the received SSB reference signal 10, 20.

Embodiments, aspects, and examples applicable to both the network node 200 and the user equipment 300 will now be disclosed.

As disclosed above, according to the report configuration, the user equipment 300 is to report at least one metric pertaining to MIMO channel information back to the network node 200. There could be different examples of such metrics. In some embodiments, one of the at least one metric indicates rank information. The rank information can be reported by means of a rank indicator (RI). In some examples, the metric is an RI, or a PMI. In further examples, the metric is a CQI. In some aspects, according to the report configuration, the user equipment 300 is to report the at least one metric (such as RI, PMI, or CQI) per frequency sub-band (where the SSB reference signal 10, 20 is transmitted over one or multiple such frequency sub-bands). The PMI could indicate either one of the two (or more) ports, e.g. the precoder [1, 0] or [0, 1] if there are two ports in total or it can indicate an amplitude and phase factor to be used over two (or more) ports, e.g. precoder [1, i] or [i, 1] if there are two ports in total, In some embodiments, the report configuration specifies parameters at least one of: ports, reference signals, OFDM symbols of the SSB reference signal 10, 20, and the measurements for each of the at least one metric are to made by the user equipment 300 based on these parameters. In some embodiments, the OFDM symbols define basic system information and synchronization information.

In some aspects, the SSB reference signal 10, 20 is transmitted on two different ports, in order for the user equipment 300 to attain MIMO channel information, i.e. channel information for higher rank than rank 1. Hence, in some embodiments, the SSB reference signal 10, 20 is configured over at least two different ports.

In some aspects, according to the report configuration, a report quantity is defined in the element CSI-ReportConfig indicating to the user equipment 300 that MIMO channel information should be reported based on SSB reference signals 10, 20. Particularly, in some embodiments, the report configuration, or at least the at least one metric, is defined in a CSI-ReportConfig element.

In some aspects, according to the report configuration, it is specified in the reportings from the user equipment 300 how the reported MIMO channel information is related to the two ports of the SSB reference signal 10, 20. For example, if rank 1 is reported, then the user equipment 300 should report which port (i.e., which SSB reference signal, or which beam) this refers to.

In some aspects, according to the report configuration, other metrics than those pertaining to MIMO channel information, are also to be reported in the reportings. For example, according to the report configuration, the user equipment 300 might be configured to report the RSRP or SINR for each reported SSB reference signal 10, 20. In particular, in some embodiments, according to the report configuration, the user equipment 300 are to report the at least one metric together with a RSRP value and/or a SINR value for the SSB reference signal 10, 20. In this case the network node 200 can select the best beam based on the reported RSRP instead of MIMO channel information, for example CQI. For this metric it could be specified in the report configuration that the user equipment 300 is to report which ports, or reference signals, or OFDM symbols, of an SSB reference signal 10, 20 that should be used to determine each metric (e.g. RSRP, CQI, PMI and rank).

In some aspects, according to the report configuration, each OFDM symbol of the SSB reference signal 10, 20 only consists of a single port. That is, in some embodiments, each of the OFDM symbols of the SSB reference signal 10, 20 is configured over one single port, and over which single port each OFDM symbol is configured varies over time. Over time, the port might thus be different for different OFDM symbols of the SSB reference signal 10, 20. That is, in some embodiments, the one single port (over which each of the OFDM symbols of the SSB reference signal 10, 20 is configured) is different for at least two of the OFDM symbols of the SSB reference signal. For example, assuming that the SSB reference signal at least comprises demodulation reference signals (DMRSs) in OFDM symbol 2 and 4 of the SSB reference signal, these OFDM symbols could be transmitted on two different ports. For example, assuming that the SSB reference signal at least comprises one pair of adjacent OFDM symbols comprising SSSs, then these two SSSs could be transmitted on two different ports.

In some aspects, according to the report configuration, all or a subset of all OFDM symbols of an SSB reference signal 10, 20 consists of two or more ports. Hence, in some embodiments, at least one of the OFDM symbols of the SSB reference signal 10, 20 is configured over at least two ports. For example, assuming that the SSB reference signal at least comprises an SSS in OFDM symbol 3, then this SSS could be transmitted over two separate ports. The SSSs transmitted on the two different ports of the same OFDM symbol might be separated either in the frequency domain or in the code domain. Hence, in some embodiments, the at least one of the OFDM symbols is configured over at least two ports by means of frequency allocations or coding.

Figure 5:
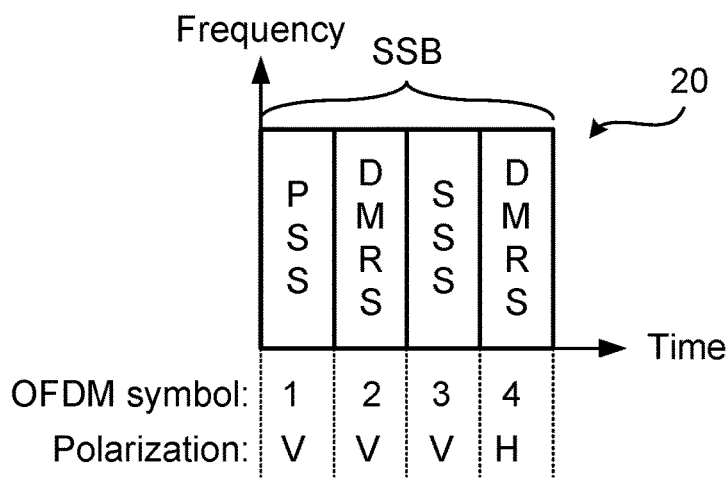
FIG. 5 is a schematic illustration of an SSB reference signal according to an embodiment.

In some aspects, the SSB reference signal is transmitted over at least two different ports, where each port is transmitted with the same beam but with mutually orthogonal polarizations. Hence, in some embodiments, the at least two different ports are transmitted in the same beam 150 but with mutually orthogonal polarizations. One example of this is illustrated in the SSB reference signal 20 of FIG. 5. In FIG. 5 the SSB reference signal 20 is composed of a PSS in OFDM symbol 1, a DMRS in OFDM symbol 2, an SSS in OFDM 3, and a DMRS in OFDM symbol 4. In this figure, the DMRS in OFDM symbol 2 of the SSB reference signal (corresponding to port 1) is transmitted with a vertical (V) polarization, and DMRS in OFDM symbol 4 of the SSB reference signal (corresponding to port 2) is transmitted with a horizontal (H) polarization. In this way, the network node 200 can determine MIMO channel information per each beam. Also, by using orthogonal polarizations for the different ports, the risk of polarization mismatch when RSRP measurements used for beam management and mobility are based on measurements on SSB reference signals is reduced.

In some aspects, the user equipment 300 is configured with the report configuration after initial access.

In this case the report configuration can be provided to the user equipment 300 as part of user equipment capability signaling.

In some aspects, the report configuration is used as a default MIMO channel information report setting which can be applied to attain MIMO channel information already during initial access.

In some aspects, the reportings from the user equipment 300 are used by the network node 200 for cell and/or beam selection with an object to optimize channel capacity rather than signal strength.

Figure 6:
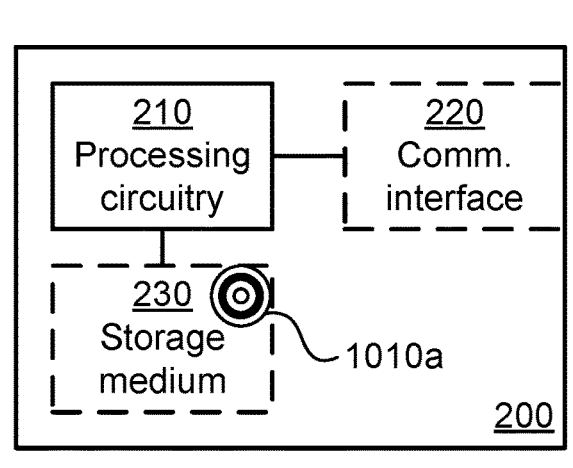
FIG. 6 is a schematic diagram showing functional units of a network node according to an embodiment.

FIG. 6 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010*a* (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, and devices, such as a plurality of user equipment 300. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 7:
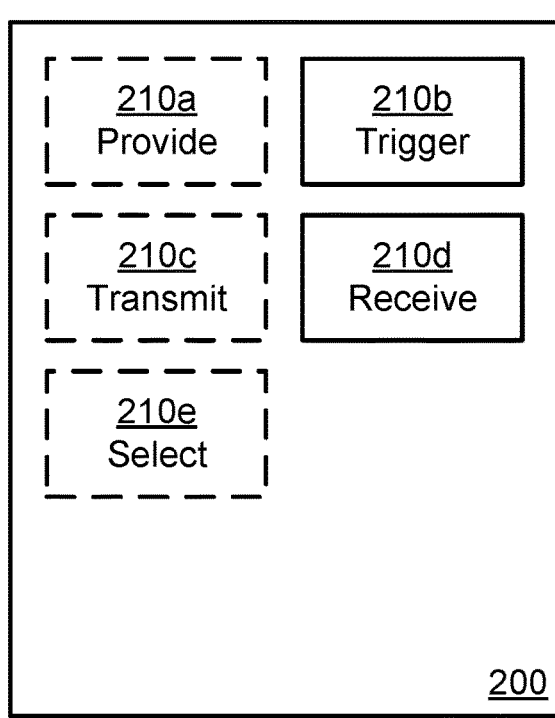
FIG. 7 is a schematic diagram showing functional modules of a network node according to an embodiment.

FIG. 7 schematically illustrates, in terms of a number of functional modules, the components of a network node 200 according to an embodiment. The network node 200 of FIG. 7 comprises a number of functional modules; a trigger module 210b configured to perform step S104, and a receive module 210d configured to perform step S108. The network node 200 of FIG. 7 may further comprise a number of optional functional modules, such as any of a provide module 210a configured to perform step S102, a transmit module 210c configured to perform step S106, and a select module 210e configured to perform step S110. In general terms, each functional module 210a:210e may be implemented in hardware or in software. Preferably, one or more or all functional modules 210a:210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a:210e and to execute these instructions, thereby performing any steps of the network node 200 as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 6 the processing circuitry 210 may be distributed among a plurality of devices, or nodes. The same applies to the functional modules 210a:210e of FIG. 7 and the computer program 1020a of FIG. 10.

FIG. 8 schematically illustrates, in terms of a number of functional units, the components of a user equipment 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the user equipment 300 to perform a set of operations, or steps, as disclosed above. For example, the storage medium 330 may store the set of operations, and the processing circuitry 310 may be configured to retrieve the set of operations from the storage medium 330 to cause the user equipment 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The user equipment 300 may further comprise a communications interface 320 for communications with other entities, functions, and devices, such as the network node 200. As such the communications interface 320 may comprise one or more transmitters and receivers, comprising analogue and digital components.

The processing circuitry 310 controls the general operation of the user equipment 300 e.g. by sending data and control signals to the communications interface 320 and the storage medium 330, by receiving data and reports from the communications interface 320, and by retrieving data and instructions from the storage medium 330. Other components, as well as the related functionality, of the user equipment 300 are omitted in order not to obscure the concepts presented herein.

FIG. 9 schematically illustrates, in terms of a number of functional modules, the components of a user equipment 300 according to an embodiment. The user equipment 300 of FIG. 9 comprises a number of functional modules; an obtain module 310b configured to perform step S204, and a provide module 310e configured to perform step S210. The user equipment 300 of FIG. 9 may further comprise a number of optional functional modules, such as any of an obtain module 310a configured to perform step S102, a receive module 310c configured to perform step S206, and an obtain module 310d configured to perform step S208. In general terms, each functional module 310a:310e may be implemented in hardware or in software. Preferably, one or more or all functional modules 310a:310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a:310e and to execute these instructions, thereby performing any steps of the user equipment 300 as disclosed herein.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the network node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the user equipment 300 as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method being performed by a network node, the method comprising:

triggering a user equipment to use a report configuration, wherein according to the report configuration the user equipment is to report at least a first metric pertaining to multiple-input multiple-output (MIMO) channel information back to the network node, and according to the report configuration the first metric is to be based on measurements made by the user equipment on a synchronization signal block (SSB) reference signal; and receiving reportings of the MIMO channel information from the user equipment in accordance with the triggered report configuration, wherein the SSB reference signal comprises a first reference signal, the SSB reference signal further comprises a second reference signal, the first reference signal of the SSB reference signal is transmitted during a first symbol, the second reference signal of the SSB reference signal is transmitted during a second symbol;

the first reference signal is transmitted with a first polarization, the second reference signal is transmitted with a second polarization, and the second polarization is orthogonal to the first polarization.

2. The method of claim 1, wherein the method further comprises:

providing the report configuration towards the user equipment.

3. The method of claim 2, wherein the report configuration is provided towards the user equipment as part of the network node performing initial access for the user equipment or upon the network node having performed initial access for the user equipment.

4. The method of claim 1, wherein the method further comprises:

transmitting the SSB reference signal.

5. The method of claim 1, wherein the method further comprises:

selecting at least one beam in which one of the user equipment is to be served by the network node based on the received reportings of the MIMO channel information from said one of the user equipment.

6. The method of claim 1, wherein the first metric indicates rank information.

7. The method of claim 6, wherein the first metric is a Rank Indicator or a Precoding Matrix Index.

8. The method of claim 7, wherein according to the report configuration the user equipment is also to report a second metric, and the second metric is a Channel Quality Indicator.

9. A non-transitory computer readable storage medium storing a computer program for triggering user equipment to use a report configuration, the computer program comprising computer code which, when run on processing circuitry of a network node, causes the network node to perform the method of claim 1.

10. A method being performed by a user equipment, the method comprising:

obtaining, from a network node, a trigger to use a report configuration, wherein according to the report configuration the user equipment is to report at least a first metric pertaining to multiple-input multiple-output (MIMO) channel information back to the network node, and according to the report configuration the first metric is to be based on measurements made by the user equipment on a synchronization signal block (SSB) reference signal; and providing reporting of the MIMO channel information to the network node in accordance with the triggered report configuration, wherein the SSB reference signal comprises a first reference signal, the SSB reference signal further comprises a second reference signal, the first reference signal of the SSB reference signal is transmitted during a first symbol, the second reference signal of the SSB reference signal is transmitted during a second symbol;

the first reference signal is transmitted with a first polarization, the second reference signal is transmitted with a second polarization, and the second polarization is orthogonal to the first polarization.

11. The method of claim 10, wherein the method further comprises:

obtaining, from the network node, the report configuration.

12. The method of claim 11, wherein the report configuration is obtained as part of initial access for the user equipment or upon initial access having been performed for the user equipment.

13. The method of claim 10, wherein the method further comprises:

receiving the SSB reference signal; and obtaining the MIMO channel information from measurements on the received SSB reference signal.

14. The method of claim 13, wherein at least part of the report configuration is obtained in the SSB reference signal that is received.

15. The method of claim 10, wherein the user equipment is preconfigured with the report configuration.

16. The method of claim 10, wherein the first metric indicates rank information.

17. The method of claim 16, wherein the first metric is a Rank Indicator or a Precoding Matrix Index.

18. A non-transitory computer readable storage medium storing a computer program for a user equipment to be triggered to use a report configuration, the computer program comprising computer code which, when run on processing circuitry of a user equipment, causes the user equipment to perform the method of claim 10.

19. A network node comprising processing circuitry, the processing circuitry being configured to cause the network node to perform a process comprising:

triggering a user equipment to use a report configuration, wherein according to the report configuration the user equipment is to report at least a first metric pertaining to multiple-input multiple-output (MIMO) channel information back to the network node, and according to the report configuration the first metric is to be based on measurements made by the user equipment on a synchronization signal block (SSB) reference signal; and receiving reportings of the MIMO channel information from the user equipment in accordance with the triggered report configuration, wherein the SSB reference signal comprises a first reference signal, the SSB reference signal further comprises a second reference signal, the first reference signal of the SSB reference signal is transmitted during a first symbol, the second reference signal of the SSB reference signal is transmitted during a second symbol;

the first reference signal is transmitted with a first polarization, the second reference signal is transmitted with a second polarization, and the second polarization is orthogonal to the first polarization.

20. A user equipment, the user equipment comprising processing circuitry, the processing circuitry being configured to cause the user equipment to perform a process comprising:

obtaining, from a network node, a trigger to use a report configuration, wherein according to the report configuration the user equipment is to report at least a first metric pertaining to multiple-input multiple-output (MIMO) channel information back to the network node, and according to the report configuration the first metric is to be based on measurements made by the user equipment on a synchronization signal block (SSB) reference signal; and providing reporting of the MIMO channel information to the network node in accordance with the triggered report configuration, wherein the SSB reference signal comprises a first reference signal, the SSB reference signal further comprises a second reference signal, the first reference signal of the SSB reference signal is transmitted during a first symbol, the second reference signal of the SSB reference signal is transmitted during a second symbol;

the first reference signal is transmitted with a first polarization, the second reference signal is transmitted with a second polarization, and the second polarization is orthogonal to the first polarization.

\* \* \* \* \*